Figure 1:
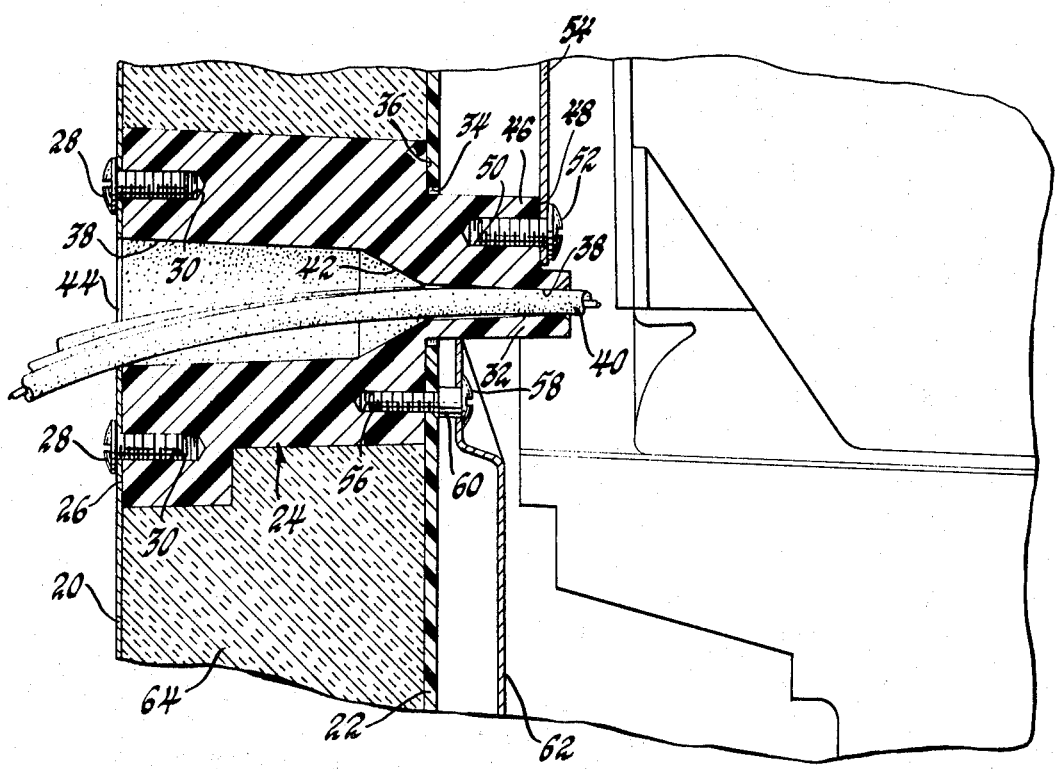

United States Patent

[11] 3,619,482

[72] Inventor Roger M. Boor
 Dayton, Ohio
[21] Appl. No. 17,508
[22] Filed Mar. 9, 1970
[45] Patented Nov. 9, 1971
[73] Assignee General Motors Corporation
 Detroit, Mich.

[54] COMBINATION STRUCTURAL SUPPORT AND ELECTRICAL DUCT
2 Claims, 2 Drawing Figs.

[52] U.S. Cl. .................................................. 174/152 G,
 16/2, 220/9 G, 220/15, 248/56, 312/214
[51] Int. Cl. ...................................................... H01b 17/58
[50] Field of Search .......................................... 174/48, 52
 R, 65 G, 152 G, 153 G, 167; 248/56; 49/167; 16/2;
 62/DIG. 3; 312/214, 223, 236; 220/9 R, 9 E, 9 G, 15

[56] References Cited
UNITED STATES PATENTS
1,189,960 7/1916 Johnson ...................... 174/152 G X
1,906,669 5/1933 Thomas, Jr. ................. 174/152 G X
2,795,639 6/1957 Rawson ........................ 174/52 R
2,799,528 7/1957 Wilfert ......................... 174/153 G X
3,151,905 10/1964 Reuther et al. ............... 174/52 R UX FOREIGN PATENTS
1,538,622 7/1968 France ........................ 174/153 G
1,074,697 2/1960 Germany ..................... 174/65 G Primary Examiner—Laramie E. Askin
Attorneys—William S. Pettigrew, Frederick M. Ritchie and Edward P. Barthel ABSTRACT: In the preferred form, a support formed of polyester resin containing glass fibers has fastened to opposite ends thereof an outer sheet metal wall and an inner plastic liner of a refrigerator. The support has a protrusion extending through an opening in the liner containing a wide flat passage therein and an external flat surface to which is fastened another sheet metal wall spaced from the liner. The wide flat passage broadens as it extends from the liner to an outer wall which has an opening of similar size. Electrical conductors extend through the passage to the interior of the refrigerator.

PATENTED NOV 9 1971 3,619,482

INVENTOR.
Roger M. Boor
BY
Carl A. Stickel
ATTORNEY

COMBINATION STRUCTURAL SUPPORT AND ELECTRICAL DUCT

This invention pertains to a combination structural support and electrical duct of strong heat and electrical insulation material for the purpose of connecting two parts or more together and also for serving as a conduit for electrical conductors.

In refrigerator construction, the substitution of plastic for metal inner liners increases the need for more structural support for the inner liner. This support can be obtained from the outer shell but thermalconduction should be limited. It is also desirable that the additional support serve additional functions.

It is an object of this invention to provide a support which may be used for supporting the inner liner from the outer shell of the refrigerator but which may have additional uses such as forming an insulated electrical conduit through which may extend one more electrical conductors and possibly supporting other parts of the refrigerator.

It is another object of this invention to provide a support of heat and electrical insulating material having spaced parallel surfaces at the ends thereof to which may be fastened spaced structures and which support contains a passage through which electrical conductors may extend.

Further objects and advantages of the present invention will be apparent from the following description, reference being had to the accompanying drawings, wherein preferred embodiments of the present invention are clearly shown.

Figure 2:
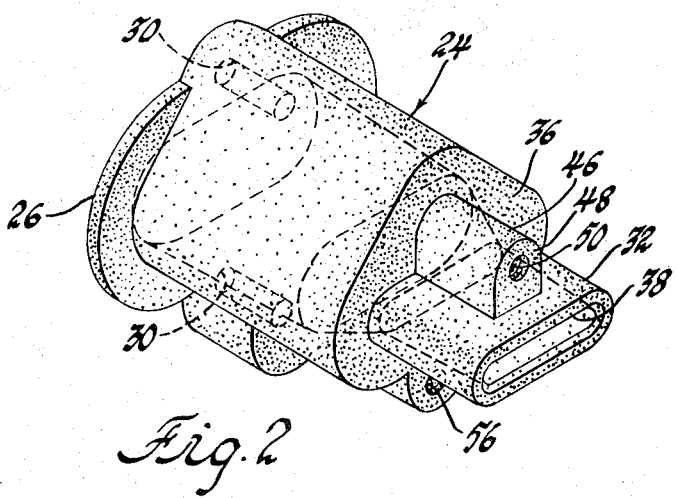

In the drawings:

FIG. 1 is a fragmentary vertical sectional view of a portion of a household refrigerator cabinet embodying one form of my invention; and FIG. 2 is a perspective view of the support shown in FIG. 1.

Referring now to FIG. 1, there is shown a vertical sheet metal outer wall portion 20 of the outer shell of the refrigerator. Spaced from the parallel to the wall 20 is a vertical wall portion 22 of sheet plastic inner liner for the refrigerator. According to this invention, this inner liner portion 22 is supported from the adjacent outer wall portion 20 by the support 24 forming the principal feature of my invention. This support 24 is preferably molded of a strong heat and electrical insulating material such as polyester resin containing glass fibers. However, other plastic resins reinforced by glass or other fibers may be used, such as phenolformaldehyde resin or phenylene oxide or other high temperature plastic resin. The support 24 has a flat face 26 contacting the inner face of the wall portion 20 which is fastened to it by the screws 28 which thread through apertures in the wall 20 into the passages 30 in the support 24. The screws 28 may be self tapping or the passage 30 may be threaded.

The opposite end of the support is provided with a protrusion 32 extending through an opening 34 in the wall 22. Surrounding the opening 34 is a shoulder 36 which is parallel to the surface 26. The protrusion 32 contains a wide flat passage 38 through which is adapted to extend a plurality of insulated electrical conductors 40. This passage enlarges in the form of a diverging cone as it extends toward the wall 20 with an enlargement 42 of greatly increased size inside the enlarged portion of the support 20. The entire passage converges toward the opening at the outer end of the protrusion 32 and is tapered so that it is easy to push the electrical conductors through the passage. The outer wall 20 has an opening 44 in alignment with the adjacent end of the passage 38.

The protrusion 32 is also provided with a boss 46 on one side having a face 48 which is parallel to but spaced from the flat surface 36. It contains a threaded aperture 50 which adapted to receive the screw 52 for fastening a sheet metal wall 54 to its surface and to hold the sheet metal wall 54 in spaced parallel relation to the wall 22. The surface 36 is provided with a threaded aperture 56 for receiving the special screw 58 having a shoulder 60 holding the adjacent portion of the plastic sheet 22 firmly in engagement with the flat surface of the shoulder 36. The head of the screw 58 is used to support the sheet metal wall 62. If desired, the apertures 50 and 56 may be plain and self tapping screws 52 and 58 may be relied upon to thread themselves firmly into the apertures. Through this form of support, arrangements are made for it to accomplish the supporting of three inner walls 22, 54 and 62 from the outer wall 20 while it also serves as a conduit of the electrical conductors 40 extending into the interior of the refrigerator.

Thermal insulation 64 preferably is provided between other parts of the wall portions 20 and 22.

While the embodiments of the invention as herein disclosed constitute preferred forms, it is to be understood that other forms might be adopted.

I claim:

1. A combined insulating support and duct including a member of a structurally strong heat and electrical insulating material having two spaced substantially parallel surfaces, a protrusion extending from one of said surfaces, a passage extending through the protrusion and having an enlarged portion extending through the remainder of said member to the other surface, said surfaces having means for receiving fastening devices, said protrusion including a flat surface spaced from the other surfaces provided with means for receiving a fastening device.

2. In combination, a first wall having a first opening therein, a second wall spaced from said first wall having a second opening therein, a combined structural support and duct member of strong heat and electrical insulating material extending between said first and second walls aligned with said openings, said member having two spaced substantially parallel surfaces, a protrusion extending from one of said surfaces, a passage extending through the protrusion and having an enlarged portion extending through the remainder of said member to the other surface, said protrusion including a flat surface spaced from the other surfaces provided with means for receiving a fastening device fastening a third wall to said protrusion surface, first fastening means adjacent said first opening fastening said first wall to said support, second fastening means adjacent said second opening fastening said second wall to said member whereby said member provides a combined structural connection and insulated electrical duct between said walls.

* * * * *